(12) United States Patent
Hamrick, Jr. et al.

(10) Patent No.: US 8,857,099 B1
(45) Date of Patent: Oct. 14, 2014

(54) FISHING LURE

(76) Inventors: Hugh E. Hamrick, Jr., Haleyville, AL (US); Jessie Clyde Holder, Haleyville, AL (US)

( * ) Notice: Subject to any disclaimer, the term of this patent is extended or adjusted under 35 U.S.C. 154(b) by 332 days.

(21) Appl. No.: 13/362,564

(22) Filed: Jan. 31, 2012

(51) Int. Cl.
*A01K 85/10* (2006.01)

(52) U.S. Cl.
USPC .................. 43/42.19; 43/42.11; 43/42.13

(58) Field of Classification Search
USPC .................... 43/42.11, 42.13, 42.19
See application file for complete search history.

(56) References Cited

U.S. PATENT DOCUMENTS

| 3,555,714 | A | | 1/1971 | Gautsche, Jr. | |
|---|---|---|---|---|---|
| 4,163,338 | A | | 8/1979 | Lucarini | |
| 4,745,700 | A | | 5/1988 | Davis | |
| 4,901,470 | A | * | 2/1990 | Gentry | 43/42.13 |
| 4,998,371 | A | | 3/1991 | Driesel | |
| 5,647,163 | A | | 7/1997 | Gorney | |
| D580,512 | S | | 11/2008 | Mehsikomer | |

* cited by examiner

*Primary Examiner* — Darren W Ark
*Assistant Examiner* — Timothy Schwarz
(74) *Attorney, Agent, or Firm* — George L Williamson

(57) ABSTRACT

Method and apparatus for a fishing lure having the basic design of a spinner bait which has an elongated main shaft having an eye for connection to the fishing line on one end and a second eye on the other end which is configured to be attached to a lure body that may have a hook, skirt and tail thereon. A main feature is that the spinner shaft is rotatably attached at approximately a 90 degree angle to the main shaft so that the spinner blade is 360 degrees rotational in the water which allows the spinner bait to remain upright after the lure is cast into the water and is sinking in the water.

8 Claims, 1 Drawing Sheet

FISHING LURE

BACKGROUND OF THE INVENTION

1. Field of the Invention

The present invention relates generally to fishing gear and, more particularly, is concerned with a fishing lure.

2. Description of the Related Art

Fishing lures have been described in the related art, however, none of the related art devices disclose the unique features of the present invention.

In U.S. Pat. No. 3,555,714 dated Jan. 19, 1971, Gautsche, Jr., disclosed an artificial fishing lure. In U.S. Pat. No. 5,647,163 dated Jul. 15, 1997, Gorney disclosed a switchable blade spinner fishing lure for Muskellunge and Northern pike. In U.S. Pat. No. 4,163,338 dated Aug. 7, 1979, Lucarini disclosed an artificial fishing lure. In U.S. Pat. No. D580,512 dated Nov. 11, 2008, Mehsikomer disclosed a spinner bait lure. In U.S. Pat. No. 4,998,371 dated Mar. 12, 1991, Driesel disclosed a fishing lure. In U.S. Pat. No. 4,745,700 dated May 24, 1988, Davis disclosed a fishing lure.

While these fishing lures may be suitable for the purposes for which they were designed, they would not be as suitable for the purposes of the present invention as hereinafter described.

SUMMARY OF THE PRESENT INVENTION

The present invention discloses a fishing lure having the basic design of a spinner bait. The present invention has an elongated main shaft having an eye for connection to the fishing line on one end and a second eye on the other end which is configured to be attached to a lure body that may have hook, skirt and tail thereon. A main feature of the present invention is that the spinner shaft is rotatably attached at approximately a 90 degree angle to the main shaft so that the spinner blade is 360 degrees rotational in the water which allows the spinner bait to remain upright after the lure is cast into the water and is sinking in the water.

An object of the present invention is to provide a fishing lure having a spinner shaft at approximately a 90 degree angle with the main shaft. A further object of the present invention is to provide a spinner shaft which is rotationally connected for 360 degree rotation about the main shaft of the fishing lure. A further object of the present invention is to provide a fishing lure which is more productive than a conventional fishing lure. A further object of the present invention is to provide a fishing lure which can be easily used by the operator. A further object of the present invention is to provide a fishing lure which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
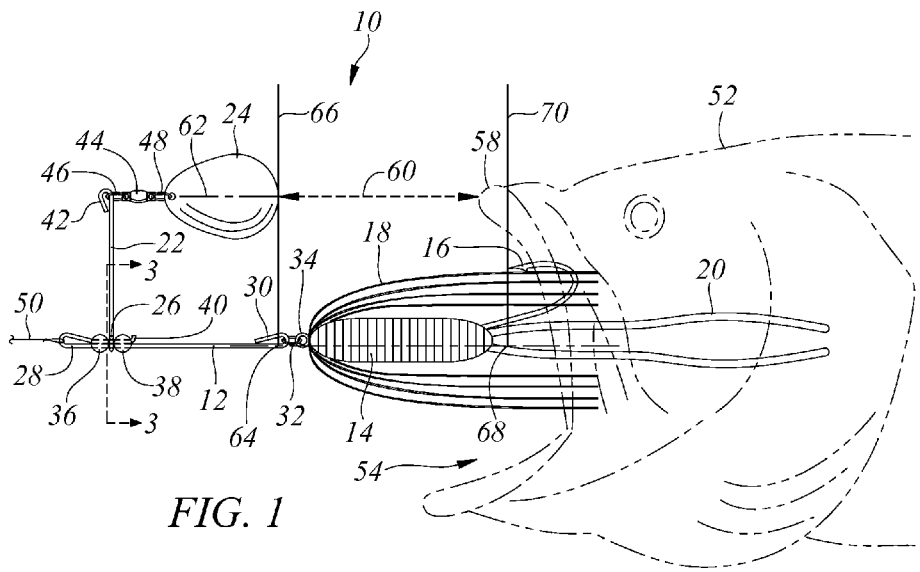
FIG. 1 is a perspective view of the present invention.

With regard to reference numerals used, the following numbering is used throughout the drawings.

10 present invention
12 main shaft
14 jig head
16 hook
18 skirt
20 tail
22 spinner shaft
24 spinner blade
26 eye
28 front eye
30 rear eye
32 ring
34 eye
36 first bead
38 second bead
40 upturned tip
42 eye
44 swivel
46 first ring
48 second ring
50 fishing line
52 fish
54 mouth
56 water surface
58 lip
60 arrow
62 center axis
64 first point
66 perpendicular line
68 second point
70 perpendicular line

DETAILED DESCRIPTION OF THE PREFERRED EMBODIMENT

Figure 3:
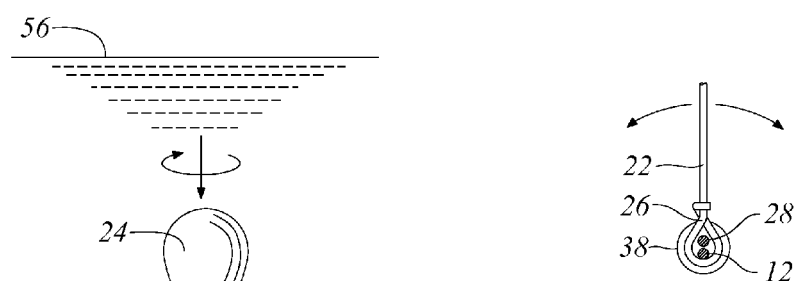
FIG. 3 is a cross-section view taken from FIG. 1 of the present invention.
Figure 2:
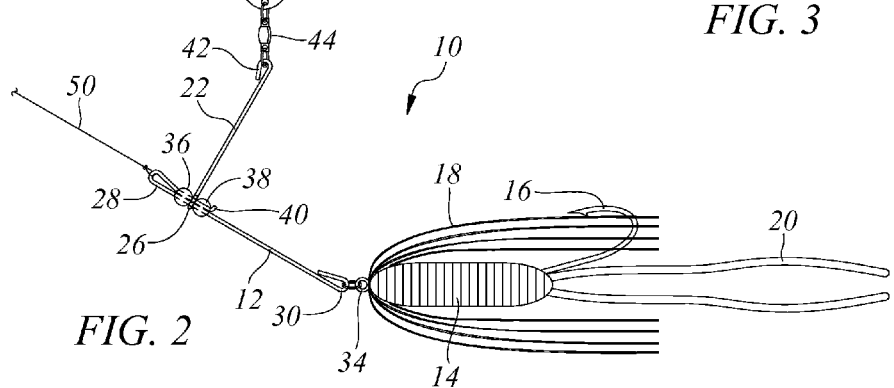
FIG. 2 is a perspective view of the present invention.

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 3 illustrate the present invention wherein a fishing lure is disclosed.

Turning to FIG. 1, therein is shown the present invention 10 along with a fish 52 striking at the present invention wherein the present invention is oriented as though it was being retrieved through the water under the surface of the water. Shown is a main shaft or wire 12 with a lure body 14, being shown for illustration only as a jighead, on its rear end along with a hook 16 and having a skirt 18 and a tail 20 thereon which, of course, are optional depending on the choice of the operator. Also shown is a spinner shaft or wire 22 having a spinner blade 24 on its end wherein the spinner shaft is connected by an eye or loop 26 so that the spinner shaft is disposed at an approximate 90 degree angle to the main shaft 12 so that the spinner shaft is 360 degrees rotational about the main shaft. Also shown on the front end of the main shaft is an eye or loop 28 for connection of fishing line 50 and having a second eye or loop 30 on its rear end so that the lure body 14 can be connected thereto using a connecting ring 32 which connects the rear eye 30 to the front nose eye 34 of the lure body 14. Also shown on the main shaft 12 are front first 36 bead or spacer in front of the spinner shaft eye 26 and a rear bead or spacer 38 behind the spinner shaft eye 26 wherein the beads 36, 38 are fixedly attached to main shaft 12 which thereby fixes eye 26 between beads 36, 38 so that eye 26 is fixedly disposed at a point between the front and rear of main shaft 12 so that it does not move longitudinally along the main shaft. Shown for illustration purposes only is one method of fixing beads 36, 38 to main shaft 12 which includes looping the front end of the main shaft 12 back upon itself so as to form an upturned tip 40 on a portion of the eye 28 of the main shaft 12 so as to permanently fix beads 36, 38 to main shaft 12 so that the spinner shaft 22 is rotational about the main shaft. One skilled in the art would understand that there are other ways to fix beads 36, 38 to main shaft 12. Also shown on spinner shaft 22 is a distal eye or loop 42 having a swivel 44 disposed between the spinner blade 24 and the eye 42 so as to allow the spinner blade to be movably attached to the eye 42. Shown for illustration only is the swivel 44 having a first connecting ring 46 for connection to eye 42 and a second connecting ring 48 thereon for connection to blade 24 as would be done in the conventional manner by one skilled in the art. When a fish 52 bites or hits the present invention 10 from either the back side, the front, top or bottom, the spinner blade 24 and/or the spinner shaft 22 will move out of the way of the lip 58 of fish 52 so that the hook 16 can enter the mouth 54 of the fish 52 so that the fish can be hooked by the hook 16 on the rear of the present invention. Arrow 60 shows the effectively large distance between the spinner blade 24 and the lip 58 of fish 52 at the instant the fish 52 strikes at the present invention 10. Also shown is the fish hook 16 having a point thereon, wherein the spinner blade 24 having a center axis 62 and a distal end thereon, wherein the distance (first distance) from a first point 64 lying on the main shaft 12 and the first eye 26 of the spinner shaft is less than ninety percent of the distance (second distance) from a second point 68 lying on a line collinear with the main shaft and the first eye of the spinner shaft, wherein the first point is formed by a line 66 perpendicular to the main shaft and tangent to the distal end of the spinner blade when the center axis of the spinner blade is parallel to the main shaft, wherein the second point is formed by a line 70 perpendicular to a line collinear with the main shaft and intersecting the point of the fish hook to permit an effective distance to exist between the distal end of the spinner blade and a mouth 54 of a fish 52 for hooking the fish when the fish strikes at the fishing lure. For illustration only, FIG. 1 shows the first distance being about forty-two percent of the second distance.

Turning to FIG. 2, therein is shown the orientation of the present invention 10 as it is sinking below the water surface 56 after it has been cast into the water. When the present invention 10 is cast and sinks below the water surface 56 the present invention becomes oriented in the water so that the spinner shaft 22 is upright in the water above the lure body 14. This orientation occurs because the spinner shaft 22 is rotatable 360 degrees about the main shaft 12 and due to the water resistance of blade 24 as the present invention sinks due to its weight and the weight of the lure body 14. A major advantage therefore of the present invention 10 is that it becomes automatically disposed in a retrieving position regardless of the orientation of the spinner shaft 22 or blade 24 in relation to the main shaft 12 at the moment the present invention hits the water surface 56 and begins to sink. Furthermore, the operator or fisherman does not have to jerk the present invention 10 in order to get the present invention to begin to spin and operate properly in the water after the present invention is cast into the water as is common with many conventional fishing lures and spinner blades. Furthermore, the spinner blade 24 of the present invention 10 doesn't rotate about the main shaft 12 but remains in an upright or upstanding position while being retrieved in the water either fast or slowly. The present invention 10 can be fished in the water so that it is just under the surface of the water 56 and the spinner blade 24 will stay under the surface of the water without jumping out of the water while it is being retrieved as is common with conventional spinner baits. When a fish 52 bites or hits the present invention 10 from either the back side, the front, top or bottom, the spinner blade 24 and/or the spinner shaft 22 will move out of the way so that the hook 16 can enter the mouth 54 of the fish 52 so that the fish can be hooked by the hook 16 on the rear of the present invention. Because of this feature, the present invention 10 increases the number of fish 52 caught per strike thereby making the present invention more productive than conventional fishing lures. Furthermore, the spinner shaft 22 minimizes the number of snags hooked by the present invention 10 thereby making the present invention snagless or weedless.

Turning to FIG. 3, therein is shown the spinner shaft 22 of the present invention being 360 degrees rotatable about the main shaft 12; also shown is eye 26 of the spinner shaft, bead 38 and the portion of the eye 28 turned back upon itself which forms and terminates in tip 40 (not shown, see FIG. 1).

In summary, and with reference to FIGS. 1-3, the following general information is hereby presented. The hook 16 of the present invention 10 is expected to be turned upward although it is believed that it could also be used pointing downwardly. When the present invention 10 is being fished as a buzz bait, i.e., retrieved very quickly, the spinner blade shaft 22 does not rotate. When the present invention 10 is cast and sinks, the spinner blade 24 always sinks in an upright position due to the water resistance of the blade 24 so that the lure body 14 is disposed downwardly due to its weight. The arms 12 and 22 may be approximately the same length, however, it is not necessary that the arms 12 and 22 be the same length and one arm could be longer or shorter than the other. The lure body 14 could be any type of lure body having a hook including a bare hook; for example, it could be a worm or minnow having a hook therein whether the lure body is a live bait or an artificial bait. The spinner blade 24 moves out of the way when a fish 52 hits the present invention 10 so that the hook 16 goes into the mouth 54 of the fish 52. The two arms 12 and 22 are disposed at a 90° angle relative to each other with the spinner blade arm 22 being straight along its entire length so that the entire shaft of the spinner blade arm is disposed at a 90° angle relative to the main shaft 12.

We claim:
1. A fishing lure, comprising:
a) a main shaft having front and rear end portions;
b) a front eye disposed on said front end portion of said main shaft to permit a fishing line to be attached thereto;
c) a rear eye disposed on said rear end portion of said main shaft having a fish hook attached;
d) a solid spinner shaft having proximal and distal end portions;

e) a first eye disposed on said proximal end portion of said spinner shaft, wherein said first eye of said spinner shaft is rotatably disposed on said main shaft adjacent said front eye of said main shaft;

f) said first eye maintaining said spinner shaft at approximately a right angle to said main shaft as said spinner shaft rotates about said main shaft;

g) a spinner blade disposed on said distal end portion of said spinner shaft; and, h) wherein said spinner shaft is rotatable 360 degrees around said main shaft, wherein said spinner shaft is upwardly disposed as the fishing lure sinks in a water body; and i) wherein a first bead and a second bead bracket said first eye of said spinner shaft on said main shaft, said main shaft extending through said beads, folded back on itself forming said front eye and passing back through said beads with an upturned end to maintain said beads in a fixed position on said main shaft.

2. The fishing lure of claim 1, further comprising a lure body being disposed on said rear end portion of said main shaft, a fish hook being disposed on said lure body.

3. The fishing lure of claim 2, wherein said spinner shaft is substantially the same length as said main shaft separating said spinner shaft from said fish hook.

4. The fishing lure of claim 2, wherein said spinner shaft is spaced a sufficient distance from said rear end portion of said main shaft so that an effective distance exists between said distal end of said spinner blade and a mouth of a fish to allow for hooking the fish when the fish strikes at the lure body.

5. A method for making a fishing lure, comprising the steps of:

a) providing a main shaft having front and rear end portions;

b) providing a front first eye on the front end portion of the main shaft to permit a fishing line to be attached thereto;

c) providing a rear eye disposed on the rear end portion of the main shaft and attaching a fish hook thereto;

d) providing a spinner shaft having proximal and distal end portions;

e) providing a first eye on the proximal end portion of spinner shaft, wherein the spinner shaft is rotatable 360 degrees around the main shaft adjacent the front eye of the main shaft;

f) said first eye maintaining said spinner shaft at approximately a right angle to said main shaft as said spinner shaft rotates about said main shaft;

g) providing a spinner blade on the distal end portion of the spinner shaft;

h) wherein the spinner shaft is upwardly disposed as the fishing lure sinks in a water body; and i) wherein a first bead and a second bead bracket said first eye of said spinner shaft on said main shaft, said main shaft extending through said beads, folded over itself forming said front eye and passing back through said beads with an upturned end to maintain said beads in a fixed position on said main shaft.

6. The method of claim 5, further comprising the steps of providing a lure body on the rear end portion of the main shaft, the lure body having a fish hook thereon.

7. The method of claim 6, wherein the spinner shaft is substantially the same length as the main shaft separating said spinner shaft from said fish hook.

8. The method of claim 6, in which said spinner shaft is spaced a sufficient distance from said rear end portion of said main shaft so that an effective distance is established between the distal end of the spinner blade and a mouth of a fish for allowing hooking the fish when the fish strikes at the fishing lure.

* * * * *